(12) United States Patent
Heitbaum et al.

(10) Patent No.: US 12,385,530 B2
(45) Date of Patent: Aug. 12, 2025

(54) DECOUPLING DEVICE AND DECOUPLING SYSTEM

(71) Applicant: Schaeffler Technologies AG & Co. KG, Herzogenaurach (DE)

(72) Inventors: Markus Heitbaum, Bühlertal (DE); Frank Frietsch, Bühlertal (DE)

(73) Assignee: Schaeffler Technologies AG, Herzogenaurach (DE)

( * ) Notice: Subject to any disclaimer, the term of this patent is extended or adjusted under 35 U.S.C. 154(b) by 0 days.

(21) Appl. No.: 18/273,061

(22) PCT Filed: Dec. 14, 2021

(86) PCT No.: PCT/DE2021/100996
§ 371 (c)(1),
(2) Date: Jul. 19, 2023

(87) PCT Pub. No.: WO2022/156843
PCT Pub. Date: Jul. 28, 2022

(65) Prior Publication Data
US 2024/0301922 A1 Sep. 12, 2024

(30) Foreign Application Priority Data
Jan. 20, 2021 (DE) .......................... 102021101141.8

(51) Int. Cl.
*F16D 25/08* (2006.01)
*F16D 23/14* (2006.01)
*F16D 25/061* (2006.01)

(52) U.S. Cl.
CPC .......... *F16D 25/083* (2013.01); *F16D 23/14* (2013.01); *F16D 25/061* (2013.01)

(58) Field of Classification Search
CPC ..... F16D 23/14; F16D 11/08–10; F16D 11/14
See application file for complete search history.

(56) References Cited

U.S. PATENT DOCUMENTS 4,462,271 A * 7/1984 Stieg ..................... F16D 25/061
475/158
5,794,752 A * 8/1998 Baer ..................... F16D 25/087
192/85.52

(Continued)

FOREIGN PATENT DOCUMENTS

CN 108603588 9/2018
DE 102008011898 9/2009

(Continued)

*Primary Examiner* — James J Taylor, II
(74) *Attorney, Agent, or Firm* — Volpe Koenig

(57) ABSTRACT

A decoupling device for separating a motor from a powertrain, having a piston which is movably mounted in a housing parallel to a longitudinal axis L of the housing and which has an arm for directly or indirectly actuating a coupling element. A first region of the piston is operatively connected to a first pressure chamber such that when pressure is applied to the first pressure chamber, the piston is moved in a first direction parallel to the longitudinal axis L. A second pressure chamber is provided which is operatively connected to a second region of the piston such that when pressure is applied to the second pressure chamber, the piston is moved in a second direction parallel to the longitudinal axis L, the second direction being opposite the first direction.

14 Claims, 3 Drawing Sheets

(56) References Cited

U.S. PATENT DOCUMENTS

| | | | | |
|---|---|---|---|---|
| 6,296,097 B1 * | 10/2001 | Hunt | ...................... | B60K 23/08 |
| | | | | 192/85.18 |
| 8,951,156 B2 * | 2/2015 | Klemm | .............. | B60K 17/3462 |
| | | | | 475/138 |
| 9,518,621 B2 * | 12/2016 | Andersson | .............. | F16D 11/10 |

FOREIGN PATENT DOCUMENTS

| | | | | |
|---|---|---|---|---|
| DE | 102014213884 | | 2/2015 | |
| DE | 102016000708 | | 7/2017 | |
| DE | 102019100397 | | 7/2020 | |
| EP | 3748200 A1 * | 12/2020 | ............. | F16D 11/10 |
| FR | 2847309 A1 * | 5/2004 | ............. | F15B 15/24 |
| JP | H04203626 | | 7/1992 | |

\* cited by examiner

DECOUPLING DEVICE AND DECOUPLING SYSTEM

CROSS-REFERENCE TO RELATED APPLICATION

This application is the U.S. National Phase of PCT Appln. No. PCT/DE2021/100996, filed Dec. 14, 2021, which claims priority from German Patent Application No. 10 2021 101 141.8, filed Jan. 20, 2021, the entire disclosures of which are incorporated by reference herein.

TECHNICAL FIELD

The disclosure relates to a device for decoupling a motor from a drive train of a motor vehicle, in particular a motor vehicle with an E-axle. Such devices are used, for example, to enable so-called "coasting" while driving, a driving mode in which a motor is switched off and decoupled from a drive train of the motor vehicle. In this mode, the available kinetic energy is used to propel the vehicle and energy losses are avoided via a drag power. In hybrid vehicles, i.e., those that have an electric motor in addition to an internal combustion engine in order to drive the motor vehicle, the coasting mode is part of the drive concept, which the engine control system can automatically switch to.

BACKGROUND

Such a decoupling device usually has a switchable clutch which is actuated by a hydraulic cylinder. The cylinder is thus brought into a decoupling position by hydraulic pressure and returned to its original position by a spring, for example. Such decoupling devices can, in principle, be used in conjunction with claw clutches, single-disc clutches, multi-disc clutches, cone clutches, switchable freewheels as well as other types of switchable clutches. They are also suitable for use both in a wet room and in a dry room of a clutch.

However, the use of decoupling devices which are returned by a mechanical spring as described above, in particular at low pressure, can lead to low and also fluctuating actuating speeds of the cylinder. These can result, for example, from fluctuations in the spring force of the mechanical spring, for example due to unavoidable tolerances.

SUMMARY

It is therefore an object of the disclosure to specify a hydraulic decoupling device as well as a decoupling system containing it, which allows for a high and at the same time constant actuating speed even at low pressure.

This object is achieved according to the disclosure by a decoupling device having one or more of the features disclosed herein. Advantageous embodiments are described below and in the claims.

A decoupling device according to the disclosure for separating a motor from a drive train has a piston which is movably mounted in a housing parallel to a longitudinal axis L of the housing and which has an arm for directly or indirectly actuating a coupling element, wherein a first region of the piston is operatively connected to a first pressure chamber such that when pressure is applied to the first pressure chamber, the piston is moved in a first direction parallel to the longitudinal axis L, wherein a second pressure chamber is provided which is operatively connected to a second region of the piston such that when pressure is applied to the second pressure chamber, the piston is moved in a second direction parallel to the longitudinal axis L, said second direction being opposite the first direction.

In the decoupling device, each of the pressure chambers can be equipped with one pressure connection each.

The piston of the decoupling device can, in particular, be formed as an annular piston which extends about the longitudinal axis L.

According to one embodiment of the decoupling device, the first region is located at a first longitudinal end of the piston and the second region is located at a second longitudinal end of the piston.

In the above-mentioned embodiment, the arm is mounted or formed centrally on the piston with respect to the direction of the longitudinal axis L.

According to an alternative embodiment of the decoupling device, the first region is located at a first longitudinal end of the piston and the second region is formed by an indentation in a lateral surface of the piston.

In this embodiment, the indentation can be formed on a radially outer half of the lateral surface of the piston as viewed with respect to the longitudinal axis L.

The disclosure also relates to a decoupling system having a decoupling device according to any one of the above-mentioned embodiments, and a first ball bearing located radially inside the piston and on which the arm of the piston is mounted.

The decoupling system can further have a claw on which the first ball bearing rests radially on the inside and which is designed to actuate a coupling element with a free end.

Furthermore, the decoupling system can have a second ball bearing on which the housing is supported radially on the outside.

BRIEF DESCRIPTION OF THE DRAWINGS

The disclosure is now explained by way of non-limiting examples with reference to the accompanying drawing. In the drawing.

DETAILED DESCRIPTION

Figure 1:
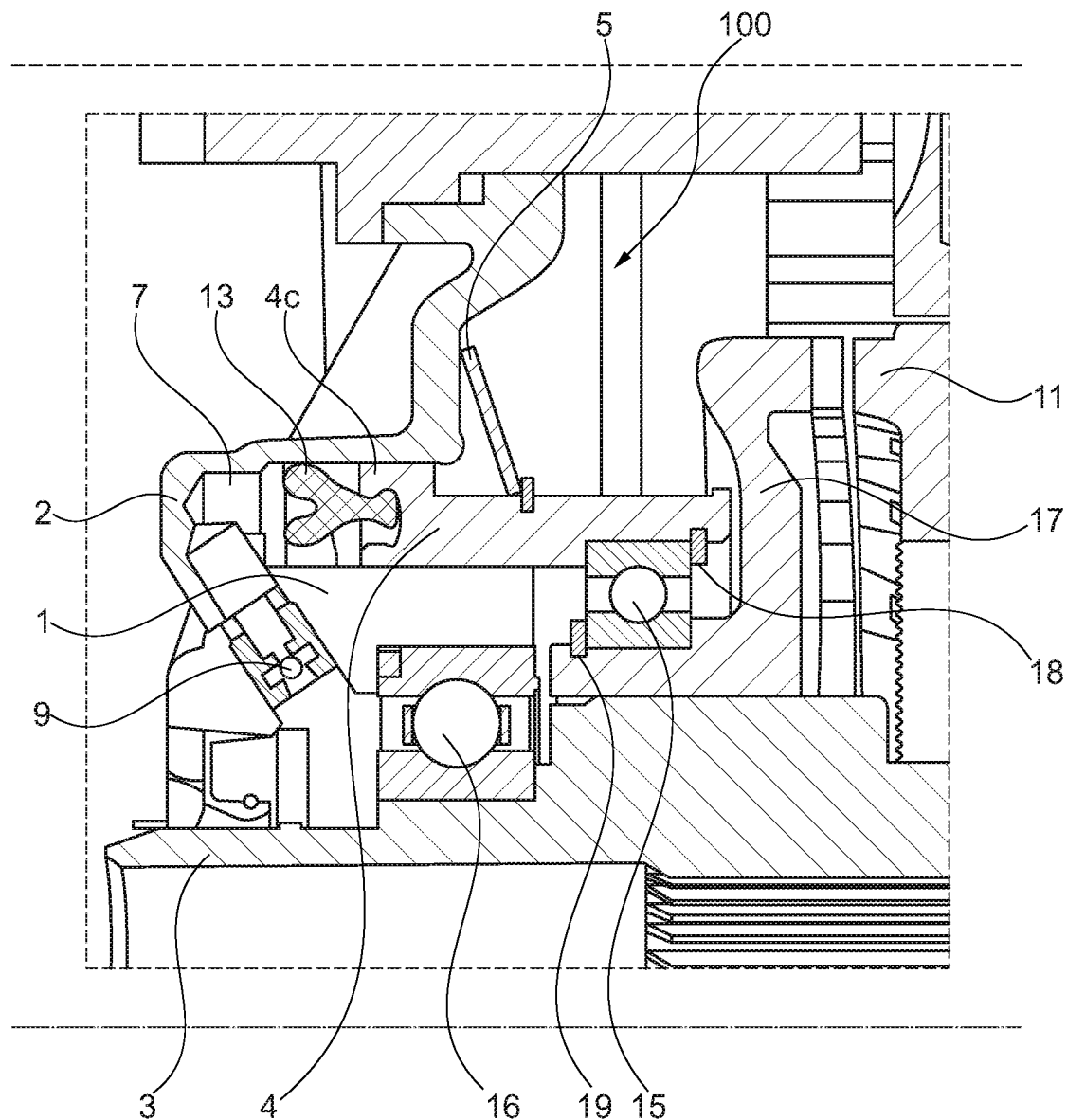
FIG. 1 shows a view of a decoupling system according to the prior art.

With reference to FIG. 1, a decoupling system 100 according to the prior art will now be described. As can be seen in the figure, the decoupling system 100 comprises a housing 1 with a housing cover 2 mounted on a drive shaft 3. A piston 4 is mounted in the housing 1 in such a way that it can move in a straight line parallel to a longitudinal axis L of the decoupling system 100, which is also the longitudinal axis L of the drive shaft 3.

Here, the piston 4 is connected via a first ball bearing 15 to a claw 17, which is used to actuate a coupling element 11. As can be seen, one circlip 18, 19 each is placed between the ball bearing 15 and the piston 4 and between the ball bearing 15 and the claw 17, respectively, to secure the first ball bearing 15. The housing 1 is in turn supported on the drive shaft 3 by a second ball bearing 16. A first end 4c of the piston 4 is connected to a first pressure chamber 7 via a first sealing ring 13, which is designed here as a grooved sealing ring.

When the decoupling system 100 according to the prior art is actuated, a hydraulic fluid is supplied to the first pressure chamber 7 via a first pressure connection 9, whereby pressure is applied to the first end 4c of the piston 4 and the piston moves to the right parallel to the longitudinal axis L in the figure. This causes the first ball bearing 15 and thus the claw 17, to which the first ball bearing 15 is coupled radially on the inside with respect to the longitudinal axis L, to be carried along in the longitudinal movement. The ball bearing 15 can be a deep groove ball bearing, for example. The claw 17 then presses on and actuates a coupling element 11, for example a fixed claw.

A spring 5, which in the figure shown is a compression spring, is used to return the piston 4. This acts so as to force the piston 4 back to its initial position in the pressureless state.

Figure 2:
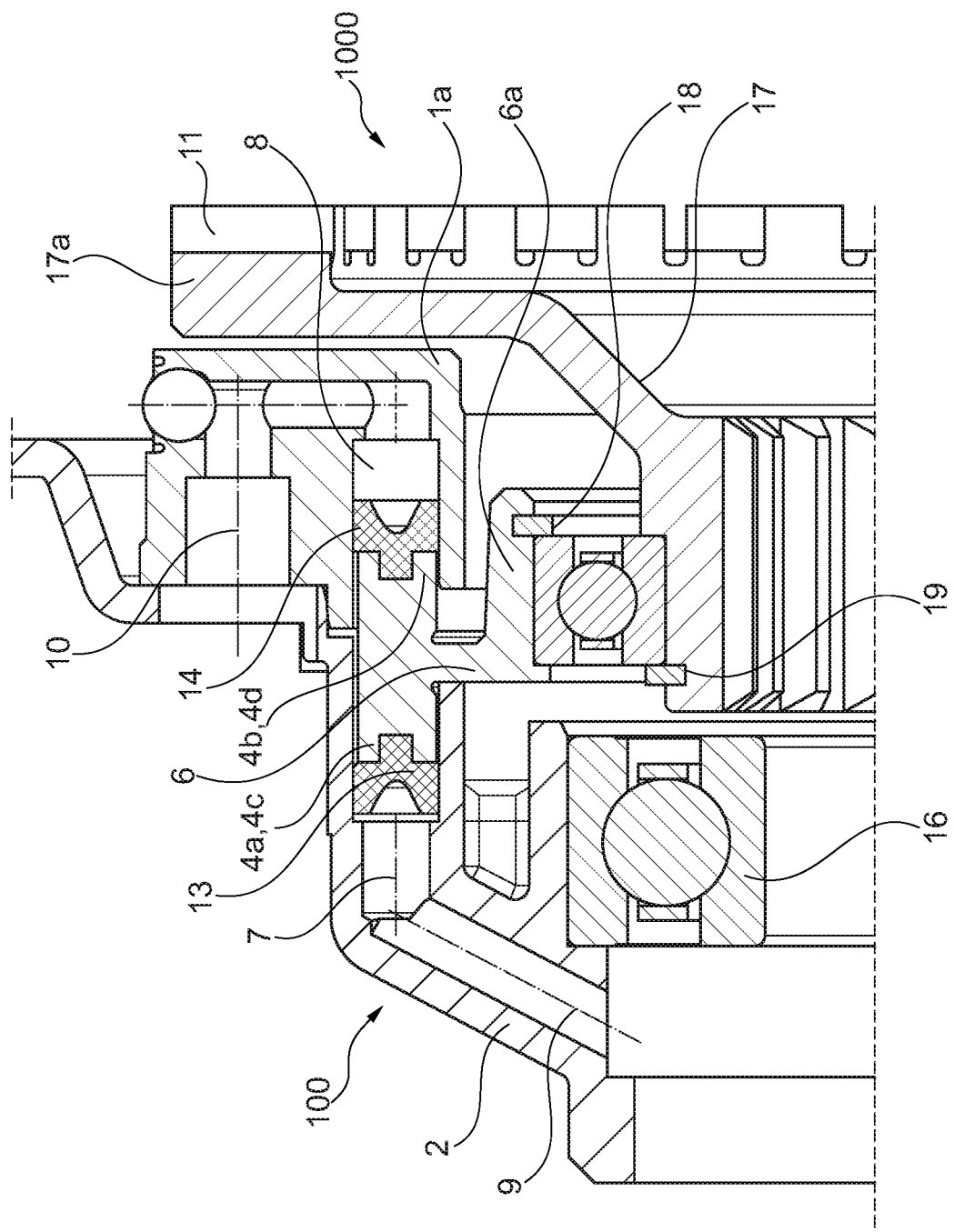
FIG. 2 shows a first embodiment according to the disclosure.

Now referencing FIG. 2, a first embodiment according to the present disclosure is described. The same or corresponding elements as in FIG. 1 are designated with the same reference symbols. A mounting of the housing 1 on the drive shaft 3 will therefore not be discussed further in the description of the embodiments according to the disclosure. In addition to the first pressure chamber 7, which is integrated into the housing cover 2 here and is operatively connected to a first region 4a of the piston 4, here to the first end 4c of the piston 4 (here via the first sealing ring 13), a second pressure chamber 8 is present, which is integrated into a housing attachment 1a, for example. The housing attachment 1a can be integrally formed with or attached to the housing 1. In this case, the second pressure chamber 8 is located parallel in the axial direction to the first pressure chamber 7 and has the same cross-section. For actuating the piston 4, the second pressure chamber 8 is operatively connected to a second region 4b of the piston 4, here to a second end 4d of the piston 4, so that hydraulic fluid supplied via a second pressure connection 10 acts on the second end 4d of the piston 4. As can be seen, the pressure generated by the hydraulic fluid of the second pressure chamber 8 acts in the sense of a movement of the piston 4 in the opposite direction with respect to the displacement of the piston 4 by hydraulic fluid in the first pressure chamber 7, consequently in the return direction.

When the decoupling device 100 is used, both pressure chambers 7, 8 are filled with fluid and are sealed between the housing cover 2, housing attachment 1a and piston 4 by means of sealing rings 13, 14, which are also designed here as grooved sealing rings. In the embodiment shown, the arm 6, which can be integrally formed with or attached to the piston 4, is formed or attached centrally on the piston 4 with respect to the longitudinal axis L. An end 6a, remote from the piston, of the arm 6 is designed such as to form a force-fitting and/or form-fitting connection with the first ball bearing 15, on its radially outer side. The radially inner side of the bearing 15 is in turn connected to a claw 17, wherein one circlip 18, 19 each secures the ball bearing 15 to the arm 6 and to the claw 17, respectively.

If pressure is now applied to the piston 4 via the first pressure chamber 7 and the first pressure connection 9, it is moved to the right in the axial direction in the view of FIG. 2, wherein the hydraulic fluid simultaneously escapes from the second pressure chamber 8 via the second pressure connection 10. Via the arm 6 and the first ball bearing 15, the movement of the piston 4 is transmitted to the claw 17 so that it presses on the coupling element 11 and accordingly engages a clutch connected to the coupling element 11.

Accordingly, the clutch is disengaged in the reverse order. An advantage of this embodiment is a very precise and accurate control (e.g. via an electrically controlled pump not shown in the figure) of the decoupling device with a short actuating speed.

In this embodiment, the housing 1 or the housing cover 2 can also be mounted on the drive shaft 3 via a second ball bearing 16.

Figure 3A:
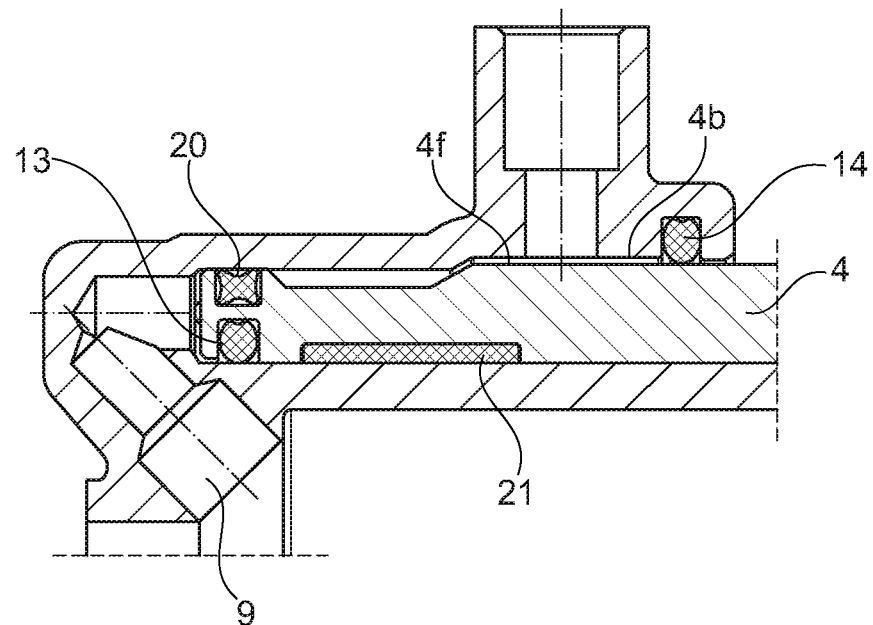
FIGS. 3A and 3B show a second embodiment according to the disclosure.
Figure 3B:
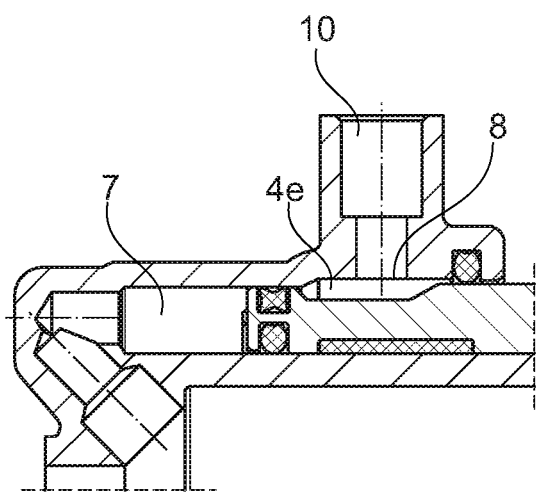

With reference to FIGS. 3A and 3B, a second according to the disclosure is now described, wherein the view of FIG. 3A shows a disengaged state of the clutch, whereas the view of FIG. 3B illustrates an engaged state of the clutch. The mounting of the housing 1 on the second ball bearing 16 as well as the arm 6 and its connection to the claw 17 are not shown in these figures, but can be designed identically or similar to the first embodiment. The detailed views in FIGS. 3A and 3B thus only show the function of the double direction piston 4 in the second embodiment.

As can be seen, pressure is applied to the second region 4b laterally on the piston 4, more specifically via an indentation 4e in a lateral surface 4f of the piston 4 and not in the axial direction from the second end 4d, as is the case in the first embodiment. Here, the piston 4 has three sealing rings 13, 14, 20, wherein the first sealing ring 13 is an A ring seal for an inner sealing to the first pressure chamber 7 and the third sealing ring 20 is an X sealing ring for the outer sealing to the first pressure chamber 7 and for the simultaneous inner sealing to the second pressure chamber 8. The outer sealing at the second pressure chamber 8 is provided by the second sealing ring 14, which is designed as an A ring seal placed in the housing 1. The third sealing ring 20 has a dual function in this regard. In principle, however, other types of seals are also suitable.

If pressure is now applied to the first pressure chamber 7 via the first pressure connection 9, the piston 4 is moved to the right in the axial direction so that the clutch is engaged, and at the same time the fluid escapes from the second pressure chamber 8 via the second pressure connection 10. Conversely, to disengage the clutch, pressure is applied to the second pressure chamber 8 and the piston 4 is moved to the left in the axial direction.

In this embodiment, a slip band 21 is intended to ensure precise axial guidance of the piston 4. However, with suitable lubrication, this can also be dispensed with.

The decoupling devices 100 shown in the embodiments of FIGS. 2 and 3A-3B can be part of a respective decoupling system 1000, which can comprise the ball bearings 15, 16 and the claw 17 in addition to the decoupling devices 100. All ball bearings 15, 16 can be designed as deep groove ball bearings, for example.

LIST OF REFERENCE SYMBOLS

1 Housing
1a Housing attachment
2 Housing cover
3 Drive shaft
4 Piston
4a First region
4b Second region
4c First end
4d Second end
4e Indentation
4f Lateral surface
5 Spring
6 Arm
6a End remote from piston
7 First pressure chamber
8 Second pressure chamber 9 First pressure connection
10 Second pressure connection
11 Coupling element
13 First sealing ring
14 Second sealing ring
15 First ball bearing
16 Second ball bearing
17 Claw
17a Free end
18 Circlip
19 Circlip
20 Third sealing ring
21 Slip band

The invention claimed is:

1. A decoupling device for separating a motor from a drive train, the decoupling device comprising:
   a housing;
   a springless piston movably mounted in the housing parallel to a longitudinal axis of the housing, the piston having an arm for actuating a coupling element;
   a first region of the piston is operatively connected to a first pressure chamber such that when pressure is applied to the first pressure chamber, the piston is moved in a first direction parallel to the longitudinal axis, the first region including a first seal coupled to a first axial end face of the springless piston; and
   a second pressure chamber which is operatively connected to a second region of the piston such that when pressure is applied to the second pressure chamber, the piston is moved in a second direction parallel to the longitudinal axis, said second direction being opposite the first direction, the second region including a second seal coupled to a second axial end face of the springless piston.

2. The decoupling device according to claim 1, wherein each of the first and second pressure chambers is equipped with one respective pressure connection.

3. The decoupling device according to claim 1, wherein the piston is an annular piston which extends about the longitudinal axis.

4. The decoupling device according to claim 1, wherein the first region is located at a first longitudinal end of the piston and the second region is located at a second longitudinal end of the piston.

5. The decoupling device according to claim 4, wherein the arm is mounted or formed centrally on the piston with respect to a direction of the longitudinal axis.

6. A decoupling system comprising the decoupling device according to claim 1, and a first ball bearing located radially inside the piston and on which the arm of the piston is mounted.

7. The decoupling system according to claim 6, further comprising a claw on which the first ball bearing rests radially on an inside and which is designed to actuate the coupling element with a free end thereof.

8. The decoupling system according to claim 6, further comprising a second ball bearing on which the housing is supported radially on an outside.

9. A decoupling device for separating a motor from a drive train, the decoupling device comprising:
   a housing;
   an annular piston movably mounted in the housing parallel to a longitudinal axis of the housing, the annular piston having a radially extending arm for actuating a coupling element;
   a first region of the piston is operatively connected to a first pressure chamber such that when pressure is applied to the first pressure chamber, the piston is moved in a first direction parallel to the longitudinal axis; and
   a second pressure chamber which is operatively connected to a second region of the piston such that when pressure is applied to the second pressure chamber, the piston is moved in a second direction parallel to the longitudinal axis, said second direction being opposite the first direction;
   wherein the first region is located at a first longitudinal end of the piston, and the second region is formed by an indentation in a lateral surface of the piston at the first longitudinal end of the piston; and
   wherein each of the first and second pressure chambers is equipped with one respective pressure connection, and the first pressure connection of the first pressure chamber is oriented non-parallel with the second pressure connection of the second pressure chamber.

10. The decoupling device according to claim 9, wherein the annular piston is supported via a ball bearing on the coupling element which is slidably supported for movement in a direction of the longitudinal axis.

11. The decoupling device according to claim 9, wherein the arm is mounted or formed centrally on the piston with respect to a direction of the longitudinal axis.

12. The decoupling device according to claim 9, wherein the indentation is formed on a radially outer half of the lateral surface of the piston as viewed with respect to the longitudinal axis.

13. The decoupling device according to claim 9, further comprising a slip band coupled to the piston and positioned on an opposite side of the piston as the indentation.

14. The decoupling device according to claim 13, wherein the slip band is positioned within a radial groove within the piston.

* * * * *